July 6, 1926. 1,591,351
H. WUNDERLICH
PISTON FOR INTERNAL COMBUSTION AND OTHER ENGINES
Filed July 21, 1925

Inventor
Hans Wunderlich

Patented July 6, 1926.

1,591,351

UNITED STATES PATENT OFFICE.

HANS WUNDERLICH, OF BERLIN, GERMANY.

PISTON FOR INTERNAL-COMBUSTION AND OTHER ENGINES.

Application filed July 21, 1925, Serial No. 45,073, and in Germany December 23, 1924.

This invention has reference to pistons for internal combustion and other engines and consists of a light piston suitable for prime movers of all kinds and in particular for motor car engines.

Many endeavours have been made for some considerable time to produce a piston for high speed engines, especially motor car engines, which is as light as possible and possesses as high a degree of heat conducting capacity as possible. With pistons of the so-called light metals, such as for example, aluminium and electron, partial success has so far only been obtained by reason of the mere fact that these metals have a good conducting power, otherwise they possess bad running or working properties and low resistance to wear and tear, furthermore they possess a co-efficient of expansion which is substantially higher than that of cast iron or similar hard metal generally forming part of the piston thereby causing great difficulties, as is well known in combining the same.

The object of the present invention is to provide improvements whereby all these disadvantages are obviated and success obtained, for the first time, by obtaining a mechanical combination between steel or cast iron or bronze and a metal of high conducting property which is able to satisfy the exacting demands of the best working conditions with such pistons.

According to this invention the piston comprises a body of comparatively good conducting metal such as aluminium or electron, so disposed in the hollow running box, jacket or rear portion of the piston and held in position by a tension disc and screw that any loosening of the body or leakage between the parts due to differences in expansion is entirely prevented owing to the tension disc being elastic or in the nature of a spring and capable of being tightened by the screw. To further prevent leakage between the parts there is employed a so-called edge or knife packing in connection therewith. The tension disc may constitute a separate part from the said hollow running box or rear portion or may be made in one piece therewith. In the latter case the tension disc is formed integrally with the said box or rear part and is of comparatively small thickness.

Figure 1:
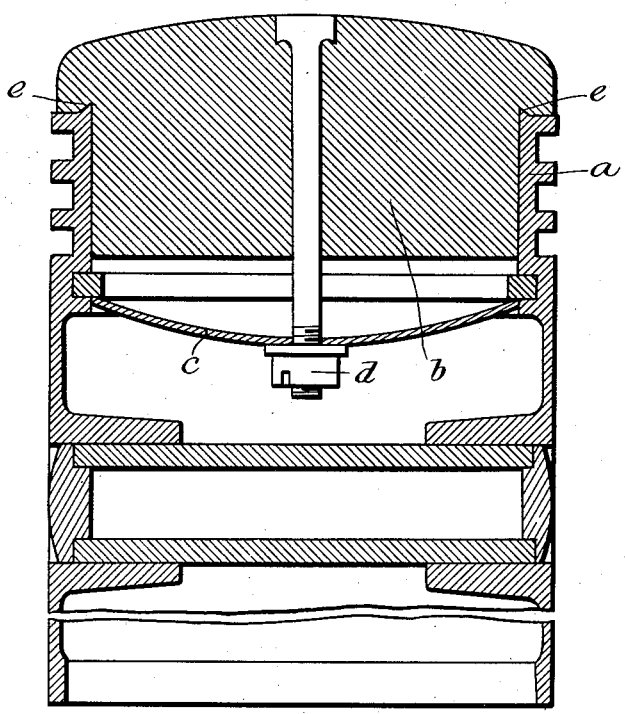
Figure 2:
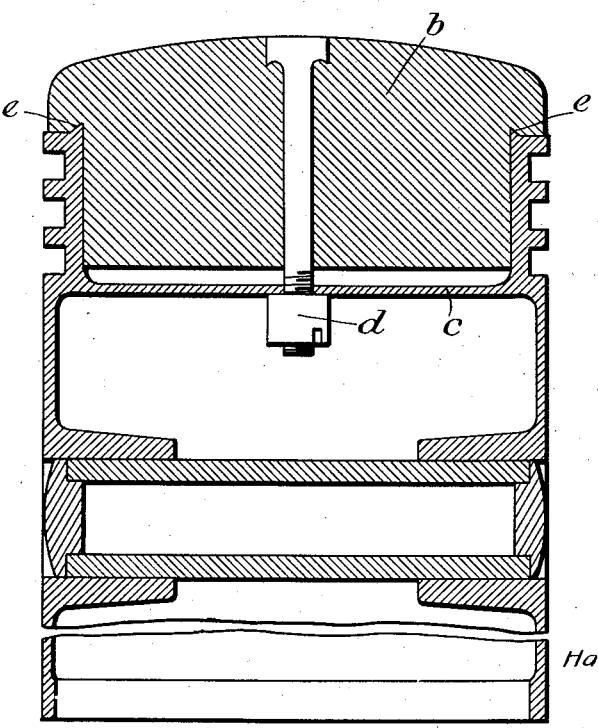

In order that the said invention may be clearly undersood and readily carried into effect, the same will now be fully described with reference to the accompanying drawing, in Figure 1 of which is illustrated in section a piston constructed according to this invention and provided with a tension disc or plate bearing against an abutment in the form of a split ring, the latter being seated in a groove formed in the inner surface of the hollow box or jacket; while in Figure 2 is illustrated an alternative construction wherein the tension disc or plate is formed integrally with the said hollow box or jacket.

In the piston shewn in the drawing, $a$ designates the hollow box or jacket of the piston, $b$ the insertion or body of especially good conducting metal as the piston head, $c$ the tension plate, $d$ the tension screw and $e$ a packing joint.

The leading idea in this construction is as follows:—

As the difference in the rate of expansion between the light metal and the iron or bronze is very considerable, no combination has been found which would comply with requirements, in that, if the parts are screwed together it was practically certain that the screwing up would not hold, apart from the fact that the light metal per se could never satisfy such mechanical requirements. Other combinations or connections, such as welding or soldering and the like, also do not hold or make efficient joints. With the present construction the varying expansions of the different parts to be combined or connected is taken into consideration from the initial stages of construction and a loosening of the parts or any leakage between the same can no longer occur. As may be seen from the drawing, the piston head $b$ of aluminium, electron or similar material sits in the piston box or jacket $a$. Hence during work, when the high combustion or explosion temperatures occur, this head can expand not only downwards, but also upwards and sideways. The axial expansions are taken up by the tension disc $c$ and this ensures a fluid proof joint or connection at $e$ between the head $b$ and box or jacket $a$. This fluid proof joint or connection is furthermore ensured by the bearing or contact between the parts being fashioned to constitute a reduced edge or a knife form of packing as designated by the said reference e.

From the foregoing it will be apparent that considerable advantage is obtained by the improved construction of the piston, the steel, bronze or cast iron box or jacket practically ensuring a permanently efficient working in the cylinder, the conduction of the heat being effectively taken up by the said piston head, and the latter being so secured to the box or jacket of the piston that loosening thereof and consequent leakage is prevented.

What I claim and desire to secure by Letters Patent of the United States is:—

1. A light piston for internal combustion and other engines, comprising a piston head constituting the entire forward end of the piston and composed of a comparatively light weight and good heat conducting metal, a separate hollow cylindrical portion arranged with its forward end in fluid tight contact against the head and composed of metal of lower heat conducting property than the said head, and means to permit the head to expand and contract axially and to maintain the fluid tight joint between the said head and the end of the cylindrical portion.

2. A light piston for internal combustion and other engines, comprising a hollow cylindrical portion provided with an axially extending annular projection at its forward end, a piston head arranged in the cylindrical portion and provided with an annular enlargement formed with an annular recess therein, the enlargement being arranged against the forward end of the cylindrical portion with the annular projection in the said recess, and means to hold the enlargement tightly against the forward end of the cylindrical portion and to permit the piston head to expand and contract axially whilst maintaining the tight contact thereof with the end of the cylindrical portion.

3. A light piston for internal combustion and other engines, comprising a piston head of comparatively light weight and good heat conducting metal, a separate hollow cylindrical portion of metal of lower heat conducting property than the said head and disposed with its forward end against the latter, an annular projection with a reduced edge on the forward end of the cylindrical portion to engage the head, and elastic means to hold the head against the reduced annular edge.

4. A light piston for internal combustion and other engines, comprising a piston head constituting the entire forward end of the piston and composed of a comparatively light weight and good heat conducting metal, a separate hollow cylindrical portion composed of metal of lower heat conducting property than the said head, an annular projection provided on the forward end of the cylindrical portion and formed with a knife edge to engage the said head and to form a fluid tight packing joint between the head and the cylindrical portion, and elastic means to hold the head tightly against the said knife edge.

5. A light piston for internal combustion and other engines, comprising a hollow cylindrical portion, a piston head arranged in the cylindrical portion and provided with an annular enlargement disposed against the forward end of the cylindrical portion the piston head being composed of comparatively good heat conducting metal of lower specific gravity than that of the cylindrical portion, a packing ring for forming a fluid tight joint between the enlargement and the forward end of the cylindrical portion, and means to hold the enlargement, the packing ring and the forward end of the cylindrical portion in close contact and to permit axial expansion and contraction of the head without diminishing the efficiency of the said joint.

6. A light piston for internal combustion and other engines, comprising a hollow cylindrical portion provided on its forward end with an axially extending annular projection formed with a knife edge, a piston head arranged in the cylindrical portion and provided with an annular enlargement to engage the said knife edge, and means to hold the enlargement against the knife edge and to permit axial expansion and contraction of the head without decreasing the engagement between the enlargement and the knife edge.

7. A light piston for internal combustion and other engines, comprising a hollow cylindrical portion provided on its forward end with an axially extending annular projection formed with a knife edge, a piston head arranged in the cylindrical portion and provided with an annular enlargement formed with an annular recess corresponding with the annular projecting knife edge, and means to hold the enlargement against the knife edge and to permit axial expansion and contraction of the head without decreasing the engagement between the enlargement and the knife edge.

8. A light piston for internal combustion and other engines, comprising a hollow cylindrical portion, a piston head arranged in the cylindrical portion and provided with an annular enlargement disposed against the forward end of the cylindrical portion the piston head being composed of comparatively good heat conducting metal of lower specific gravity than that of the cylindrical portion, a thin tension disc supported in the cylindrical portion, and means connecting the piston head to the tension disc.

9. A light piston for internal combustion and other engines, comprising a hollow cylindrical portion, a piston head arranged in the cylindrical portion and provided with an annular enlargement disposed against the forward end of the cylindrical portion, the piston head being composed of comparatively good heat conducting metal of lower specific gravity than that of the cylindrical portion, a thin tension disc, an abutment on the cylindrical portion for the disc, and means connecting the piston head to the tension disc.

10. A light piston for internal combustion and other engines, comprising a hollow cylindrical portion provided with an axially extending annular projection at its forward end, a piston head arranged in the cylindrical portion and provided with an annular enlargement formed with an annular recess therein the enlargement being arranged against the forward end of the cylindrical portion with the annular projection in the said recess, a thin tension disc, an abutment on the cylindrical portion for the disc, and means connecting the piston head to the tension disc.

11. A light piston for internal combustion and other engines, comprising a piston head constituting the entire forward end of the piston and composed of a comparatively light weight and good heat conducting metal, a separate hollow cylindrical portion arranged with its forward end in fluid tight contact against the head and composed of metal of lower heat conducting property than the said head, an annular projection provided on the forward end of the cylindrical portion and formed with a knife edge, to engage the said head and to form a fluid tight packing joint between the head and the cylindrical portion, a thin tension disc, an abutment on the cylindrical portion for the disc, and means connecting the piston head to the tension disc.

12. A light piston for internal combustion and other engines, comprising a hollow cylindrical portion, a piston head arranged in the cylindrical portion and provided with an annular enlargement disposed against the forward end of the cylindrical portion the piston head being composed of comparatively good heat conducting metal of lower specific gravity than that of the cylindrical portion, a packing ring for forming a fluid tight contact joint between the enlargement and the forward end of the cylindrical portion, a thin tension disc, an abutment on the cylindrical portion for the disc, and means connecting the piston head to the tension disc.

13. A light piston for internal combustion and other engines, comprising a piston head of comparatively light weight and good heat conducting metal, a separate hollow cylindrical portion of metal of lower heat conducting property than the said head and disposed with its forward end against the latter, a thin tension disc, an annular channel in the cylindrical portion, an abutment for the tension disc the abutment being disposed in the annular channel, and a screw threaded bolt and nut for securing the piston head to the tension disc.

14. A light piston for internal combustion and other engines, comprising a piston head of comparatively light weight and good heat conducting metal, a separate hollow cylindrical portion of metal of lower heat conducting property than the said head and disposed with its forward end against the latter, an annular projection on the end of the cylindrical portion to engage the head, a thin tension disc, an annular channel in the cylindrical portion, an abutment for the tension disc the abutment being disposed in the annular channel, and a screw threaded bolt and nut for securing the piston head to the tension disc.

15. A light piston for internal combustion and other engines, comprising a hollow cylindrical portion, a piston head arranged in the cylindrical portion and provided with an annular enlargement disposed against the forward end of the cylindrical portion the piston head being composed of comparatively good heat conducting metal of lower specific gravity than that of the cylindrical portion, a thin tension disc, an annular channel in the cylindrical portion, an abutment for the tension disc the abutment being disposed in the annular channel, and a screw threaded bolt and nut for securing the piston head to the tension disc.

16. A light piston for internal combustion and other engines, comprising a hollow cylindrical portion provided with an axially extending annular projection at its forward end, a piston head arranged in the cylindrical portion and provided with an annular enlargement formed with an annular recess therein the enlargement being arranged against the forward end of the cylindrical portion with the annular projection in the said recess, a thin tension disc, an annular channel in the cylindrical portion, an abutment for the tension disc the abutment being disposed in the annular channel, and a screw threaded bolt and nut for securing the piston head to the tension disc.

17. A light piston for internal combustion and other engines, comprising a piston head constituting the entire forward end of the piston and composed of a comparatively light weight and good heat conducting metal, a separate hollow cylindrical portion arranged with its forward end in fluid tight contact against the head and composed of metal of lower heat conducting property than the said head, an annular projection provided on the forward end of the cylindrical portion and formed with a knife edge to engage the said head and to form a fluid tight packing joint between the head and the cylindrical portion, a thin tension disc, an annular channel in the cylindrical portion, an abutment for the tension disc the abutment being disposed in the annular channel, and a screw threaded bolt and nut for securing the piston head to the tension disc.

18. A light piston for internal combustion and other engines, comprising a hollow cylindrical portion, a piston head arranged in the cylindrical portion and provided with an annular enlargement disposed against the forward end of the cylindrical portion the piston head being composed of comparatively good heat conducting metal of lower specific gravity than that of the cylindrical portion, a packing ring for forming a fluid tight joint between the enlargement and the forward end of the cylindrical portion, a thin tension disc, an annular channel in the cylindrical portion, an abutment for the tension disc, the abutment being disposed in the annular channel, and a screw threaded bolt and nut for securing the piston head to the tension disc.

19. A light piston for internal combustion and other engines, comprising a hollow steel cylindrical portion, an aluminium piston head arranged in the cylindrical portion and provided with an annular enlargement disposed against the forward end of the cylindrical portion, a thin tension disc, an abutment on the cylindrical portion for the disc, and means connecting the piston head to the tension disc.

20. A light piston for internal combustion and other engines, comprising a hollow steel cylindrical portion, an aluminium piston head arranged in the cylindrical portion and provided with an annular enlargement disposed against the forward end of the cylindrical portion, a packing ring for forming a fluid tight contact joint between the enlargement and the forward end of the cylindrical portion, a thin tension disc, an abutment on the cylindrical portion for the disc, and means connecting the piston head to the tension disc.

21. A light piston for internal combustion and other engines, comprising a hollow piston box with a reduced edge thereon, a piston head body of comparatively good conducting metal seated therein and engaging the reduced edge, a tension disc provided in the said box and a tightening screw connected to the said body and engaging the said tension disc.

22. A light piston for internal combustion and other engines, comprising a hollow piston box with a knife edge, a piston head body seated in the box and engaging the said knife edge which serves as a packing for the joint between the parts, a comparatively thin tension disc provided in the box and a screw which engages the disc and holds the said body against the knife edge.

HANS WUNDERLICH.